(12) United States Patent
Park et al.

(10) Patent No.: US 12,002,933 B2
(45) Date of Patent: Jun. 4, 2024

(54) ELECTRODE ASSEMBLY FOR SECONDARY BATTERY INCLUDING DIFFERENT SHAPED ELECTRODES

(71) Applicant: LG ENERGY SOLUTION, LTD., Seoul (KR)

(72) Inventors: Hyun Park, Daejeon (KR); Hyun Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 145 days.

(21) Appl. No.: 17/599,701

(22) PCT Filed: Sep. 28, 2020

(86) PCT No.: PCT/KR2020/013192
§ 371 (c)(1),
(2) Date: Sep. 29, 2021

(87) PCT Pub. No.: WO2021/066446
PCT Pub. Date: Apr. 8, 2021

(65) Prior Publication Data
US 2022/0200068 A1    Jun. 23, 2022

(30) Foreign Application Priority Data
Oct. 1, 2019  (KR) .................. 10-2019-0121442

(51) Int. Cl.
*H01M 50/531*    (2021.01)
*H01M 10/44*    (2006.01)
*H01M 50/105*    (2021.01)

(52) U.S. Cl.
CPC ....... *H01M 10/441* (2013.01); *H01M 50/531* (2021.01); *H01M 50/105* (2021.01); *H01M 2220/20* (2013.01)

(58) Field of Classification Search
CPC ............ H01M 10/441; H01M 50/531; H01M 50/105; H01M 2220/20
See application file for complete search history.

(56) References Cited

U.S. PATENT DOCUMENTS

2012/0148913 A1* 6/2012 Chiba .................. H01M 50/54
29/730
2013/0143109 A1* 6/2013 Kim ...................... H01M 50/54
429/178

(Continued)

FOREIGN PATENT DOCUMENTS

CN    103098285 A    5/2013
CN    103119754 A    5/2013

(Continued)

OTHER PUBLICATIONS

KR20170104826MT (Year: 2017).*

(Continued)

*Primary Examiner* — Alexander Usyatinsky
(74) *Attorney, Agent, or Firm* — Birch, Stewart, Kolasch & Birch, LLP

(57) ABSTRACT

An electrode assembly for a secondary battery includes at least one positive electrode and at least one negative electrode alternately stacked in a state in which a separator is interposed therebetween. The positive electrode includes a first positive electrode having a single positive electrode tab and a second positive electrode having two or more positive electrode tabs. The negative electrode includes a first negative electrode having a single negative electrode tab and a second negative electrode having two or more negative electrode tabs. The output of the electrode assembly is adjustable.

14 Claims, 4 Drawing Sheets

(56) References Cited

U.S. PATENT DOCUMENTS

| | | |
|---|---|---|
| 2013/0196210 A1 | 8/2013 | Kim et al. |
| 2014/0030579 A1 | 1/2014 | Kim et al. |
| 2014/0342194 A1 | 11/2014 | Wang et al. |
| 2014/0356698 A1 | 12/2014 | Kong |
| 2017/0005318 A1 | 1/2017 | Otohata |
| 2018/0254467 A1 | 9/2018 | Jeong et al. |
| 2018/0315980 A1 | 11/2018 | Lee et al. |
| 2019/0067671 A1 | 2/2019 | Buckholz et al. |
| 2019/0190092 A1 | 6/2019 | Kim et al. |
| 2020/0235436 A1 | 7/2020 | Kim et al. |

FOREIGN PATENT DOCUMENTS

| | | | |
|---|---|---|---|
| CN | 203085688 A | | 7/2013 |
| CN | 108336416 | * | 7/2018 |
| CN | 208862111 U | | 5/2019 |
| EP | 0 370 534 A2 | | 5/1990 |
| EP | 3 442 073 A1 | | 2/2019 |
| JP | 7-60694 B2 | | 6/1995 |
| JP | H02223156 | * | 6/1995 |
| KR | 10-1139016 B1 | | 4/2012 |
| KR | 20130022698 | * | 3/2013 |
| KR | 10-1254691 B1 | | 4/2013 |
| KR | 10-2018-0091031 A | | 8/2013 |
| KR | 10-2014-0083344 A | | 7/2014 |
| KR | 10-2014-0110136 A | | 9/2014 |
| KR | 10-2016-0008617 A | | 1/2016 |
| KR | 10-2017-0027544 A | | 3/2017 |
| KR | 10-2017-0046938 A | | 5/2017 |
| KR | 10-2017-0104826 A | | 9/2017 |
| KR | 20170104826 | * | 9/2017 |
| KR | 10-1789006 B1 | | 10/2017 |
| KR | 10-2018-0007298 A | | 1/2018 |
| KR | 10-1613771 B1 | | 4/2018 |
| KR | 10-2018-0079924 A | | 7/2018 |
| KR | 10-1921730 B1 | | 11/2018 |
| KR | 10-1984314 B1 | | 5/2019 |
| WO | WO 91/11828 A1 | | 8/1991 |

OTHER PUBLICATIONS

CN108336416MT (Year: 2018).*
JPH02223156MT (Year: 1995).*
Decision of SIPO to grant a Patent for Application No. CN 202080033022 (Year: 2023).*
International Search Report (PCT/ISA/210) issued in PCT/KR2020/013192, dated Jan. 13, 2021.
Extended European Search Report for European Application No. 20870645.7, dated Jun. 27, 2022.

* cited by examiner

【FIG. 1】
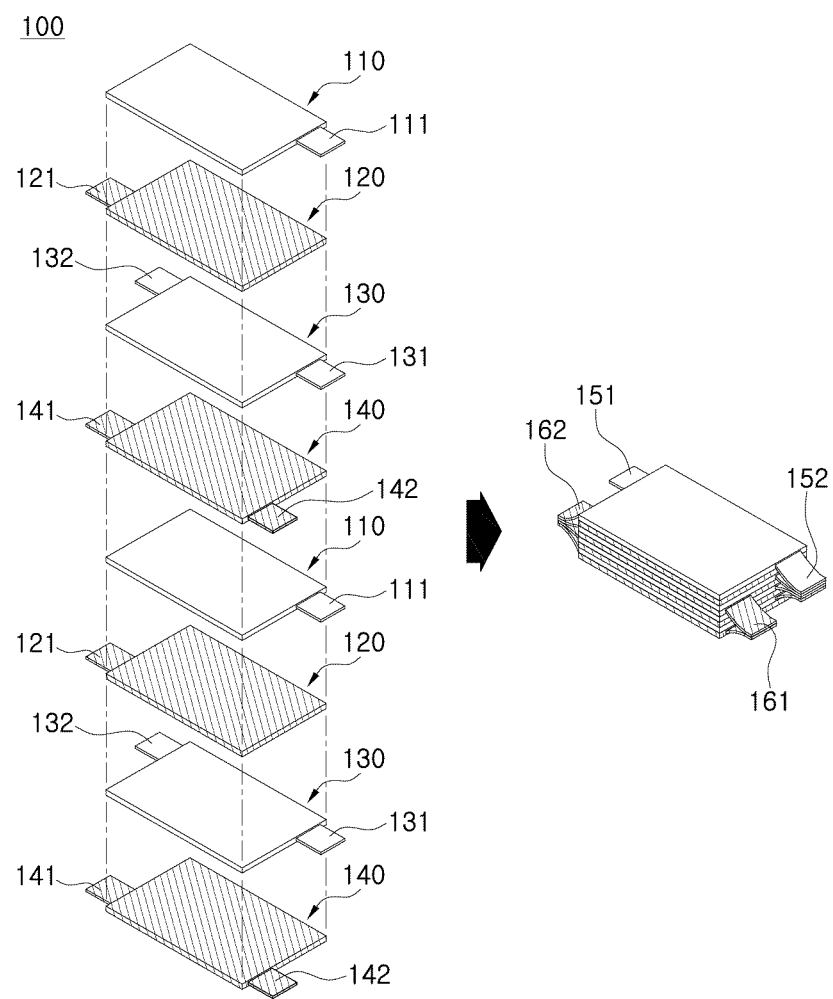

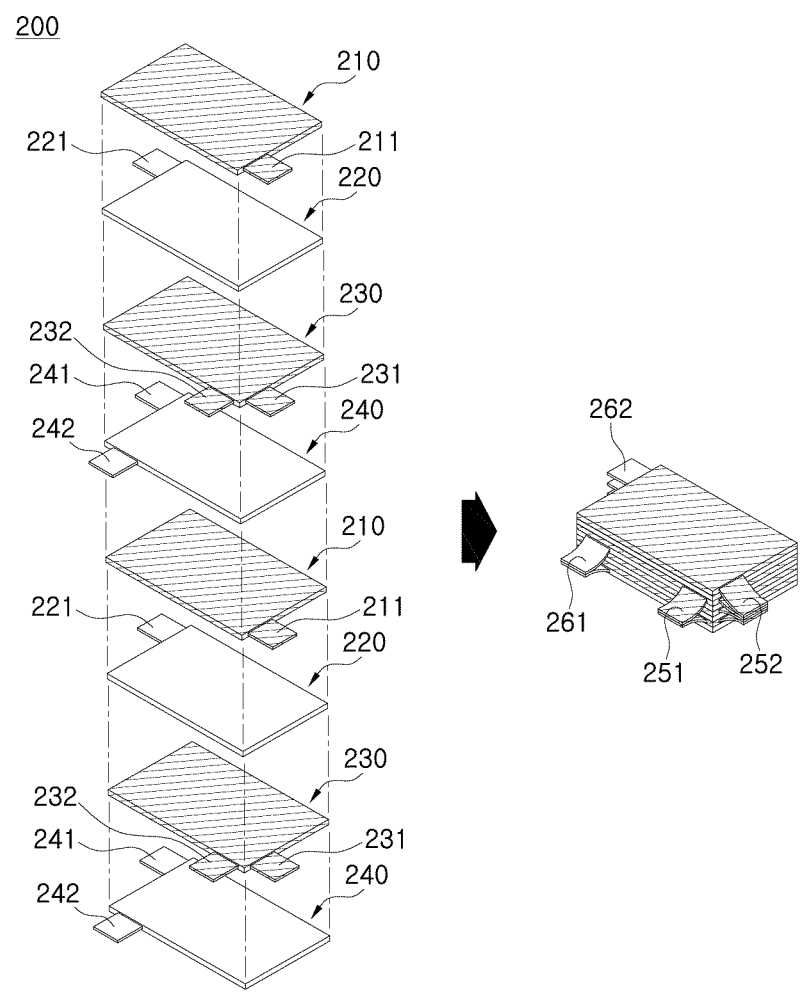
[FIG. 2]

[FIG. 3]
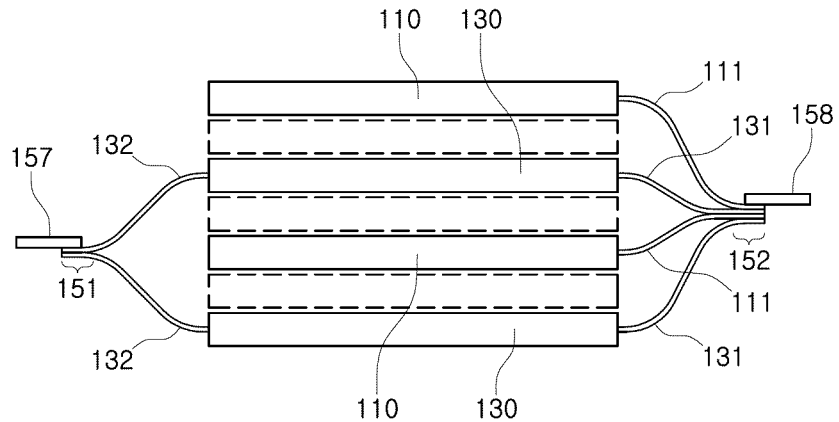
[FIG. 4]
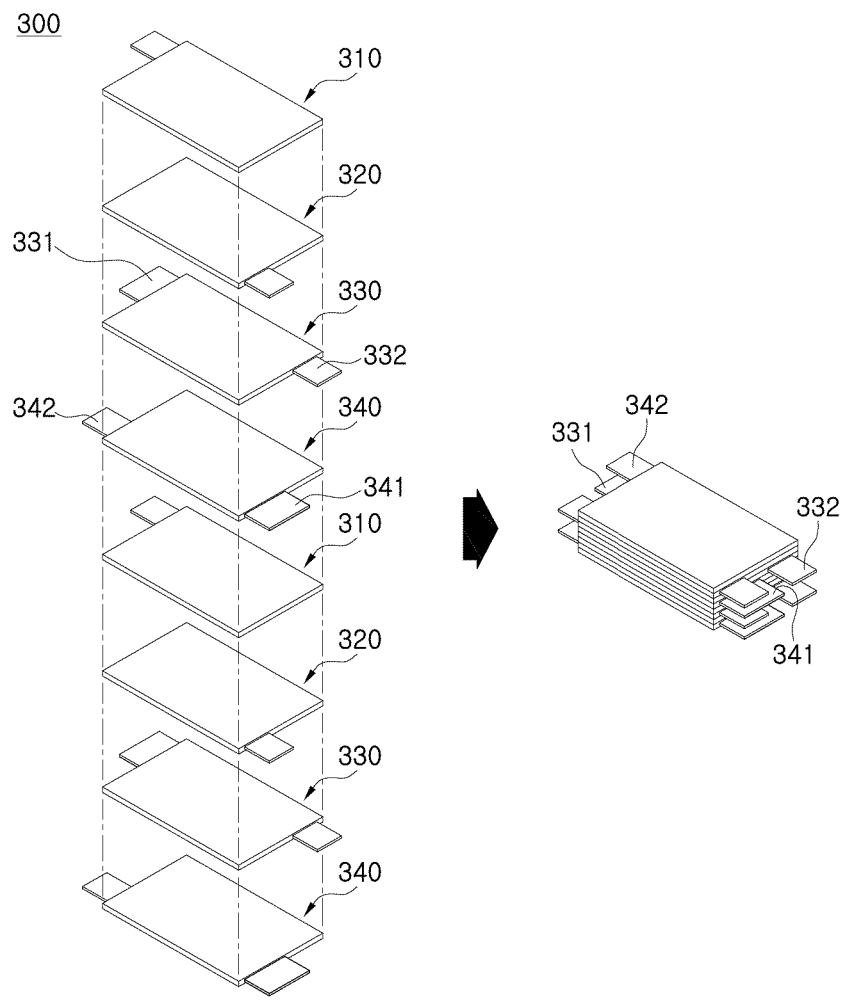

【FIG. 5】
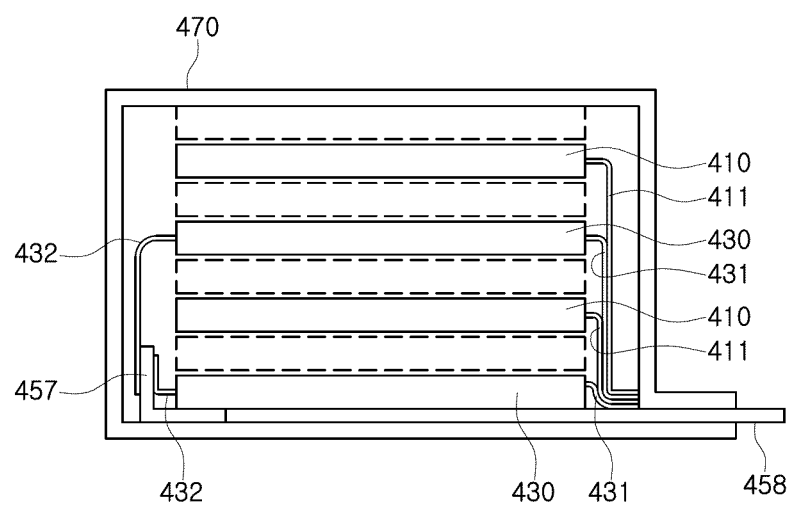

ELECTRODE ASSEMBLY FOR SECONDARY BATTERY INCLUDING DIFFERENT SHAPED ELECTRODES

TECHNICAL FIELD

This application claims the benefit of priority to Korean Patent Application No. 2019-0121442 filed on Oct. 1, 2019, the disclosure of which is hereby incorporated by reference herein its entirety.

The present invention relates to an electrode assembly for a secondary battery including different shaped electrodes, and more particularly to an electrode assembly including positive electrodes having different numbers of positive electrode tabs and negative electrodes having different numbers of negative electrode tabs.

BACKGROUND ART

A lithium secondary battery, which has an environmentally friendly advantage in that by-products are hardly generated as the result of using energy, has attracted attention as a new energy source.

Depending on the kind of a sheathing material, the lithium secondary battery may be classified as a pouch-shaped secondary battery, a cylindrical secondary battery, or a prismatic secondary battery. The pouch-shaped secondary battery, which can be freely modified in shape and has high energy density, has increasingly been used.

The pouch-shaped secondary battery is configured to have a structure in which an electrode assembly is received in a pouch-shaped battery case and in which electrode leads of the electrode assembly protrude outwards from the battery case. The electrode leads function as electrode terminals.

In recent years, the size and capacity of the lithium secondary battery have also been increased with the advent of devices that require large capacity and high output, such as a hybrid electric vehicle, an electric vehicle, or a power storage apparatus.

In the lithium secondary battery, generation of heat from a battery cell is abruptly increased due to repetitive charge and discharge thereof. Such a heat generation phenomenon may cause deterioration in function of the lithium secondary battery.

In connection therewith, Patent Document 1 discloses a secondary battery configured to have a structure in which a plurality of sets, each of which includes a positive electrode plate, a separator, and a negative electrode plate, is stacked to constitute an electrode assembly, in which the positive electrode plate includes a positive electrode tab and an independent positive electrode tab, and in which the negative electrode plate includes a negative electrode tab.

In the secondary battery disclosed in Patent Document 1, a sensing tab is added in addition to respective electrode tabs, whereby it is possible to check output voltage in real time through the sensing tab without installation of a bus bar. However, there is a problem in that it is difficult to apply the disclosed secondary battery to a device that requires high output.

Patent Document 2 discloses a secondary battery including a positive electrode plate having a plurality of positive-electrode-side electrode tabs and a negative electrode plate having a plurality of negative-electrode-side electrode tabs, wherein the plurality of positive-electrode-side electrode tabs is joined to the upper surface or the lower surface of a positive electrode lead depending on the height thereof and wherein the plurality of negative-electrode-side electrode tabs is joined to the upper surface or the lower surface of a negative electrode lead depending on the height thereof.

In the secondary battery disclosed in Patent Document 2, it is possible to optimize resistance due to connection between terminals of the secondary battery in a high-current or large-capacity battery environment, but there is a problem in that it is difficult to adjust the output amount of the secondary battery.

Therefore, there is a necessity for an electrode assembly for a secondary battery having a structure capable of adjusting the output amount of a secondary battery while minimizing generation of heat due to repetitive charge and discharge thereof.

PRIOR ART DOCUMENTS (Patent Document 1) Korean Registered Patent Publication No. 1984314 (2019 May 24)
(Patent Document 2) Korean Registered Patent Publication No. 1254691 (2013 Apr. 9)

DISCLOSURE

Technical Problem

The present invention has been made in view of the above problems, and it is an object of the present invention to provide an electrode assembly including a plurality of positive electrodes having different numbers of positive electrode tabs and a plurality of negative electrodes having different numbers of negative electrode tabs, wherein resistance of the electrode assembly is low and output of the electrode assembly is adjustable.

Technical Solution

In order to accomplish the above object, an electrode assembly for a secondary battery according to the present invention includes at least two positive electrodes and at least two negative electrodes alternately stacked in the state in which a separator is interposed therebetween, wherein the at least two positive electrodes include at least one positive electrode having a single positive electrode tab and at least one second positive electrode having two or more positive electrode tabs, and the at least two negative electrodes include at least one first negative electrode having a single negative electrode tab and at least one second negative electrode having two or more negative electrode tabs.

The at least one second positive electrode may include a low-rate positive electrode tab configured to form a first positive electrode tab bundle and a high-rate positive electrode tab configured to form a second positive electrode tab bundle, and the at least one second negative electrode may include a low-rate negative electrode tab configured to form a first negative electrode tab bundle and a high-rate positive electrode tab configured to form a second negative electrode tab bundle.

The high-rate positive electrode tab and the low-rate positive electrode tab may be located at different outer peripheries of the positive electrode, and the high-rate negative electrode tab and the low-rate negative electrode tab may be located at different outer peripheries of the negative electrode.

In addition, the high-rate positive electrode tab and the low-rate positive electrode tab may extend in opposite directions, and the high-rate negative electrode tab and the low-rate negative electrode tab may extend in opposite directions.

In addition, the width of each of the high-rate positive electrode tab and the high-rate negative electrode tab may be equal to or greater than the width of each of the low-rate positive electrode tab and the low-rate negative electrode tab.

A first positive electrode lead and a second positive electrode lead may be connected to the first positive electrode tab bundle and the second positive electrode tab bundle, respectively, and a first negative electrode lead and a second negative electrode lead may be connected to the first negative electrode tab bundle and the second negative electrode tab bundle, respectively.

The first positive electrode lead and the second positive electrode lead may be connected to each other and the first negative electrode lead and the second negative electrode lead may be connected to each other in a battery case.

Charge and discharge of a secondary battery through the second positive electrode tab bundle and the second negative electrode tab bundle may be performed only under a high-rate condition.

Charge and discharge of a secondary battery through the first positive electrode tab bundle, the second positive electrode tab bundle, the first negative electrode tab bundle, and the second negative electrode tab bundle may be performed only under a maximum-rate condition.

The present invention provides a pouch-shaped secondary battery comprising the electrode assembly in a pouch-shaped battery case.

In addition, the present invention provides a battery pack including the pouch-shaped secondary battery, wherein the battery pack includes a controller configured to adjust the output amount of the battery pack.

The controller may be configured to determine a low-rate condition, a high-rate condition, and a maximum-rate condition, to perform output through a first positive electrode tab bundle and a first negative electrode tab bundle under the low-rate condition, to perform output through a second positive electrode tab bundle and a second negative electrode tab bundle under the high-rate condition, and to perform output through the first positive electrode tab bundle, the second positive electrode tab bundle, the first negative electrode tab bundle, and the second negative electrode tab bundle under the maximum-rate condition.

DESCRIPTION OF DRAWINGS

FIG. 1 is an exploded view and a perspective view of an electrode assembly according to a first embodiment.

FIG. 2 is an exploded view and a perspective view of an electrode assembly according to a second embodiment.

FIG. 3 is a front view showing the state in which electrode leads are connected to the electrode assembly of FIG. 1.

FIG. 4 is an exploded view and a perspective view of an electrode assembly according to a third embodiment.

FIG. 5 is a vertical sectional view showing the state in which an electrode assembly according to a fourth embodiment is received in a battery case.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, the details defined in the dependent claims may be applied to all embodiments described in this specification.

Hereinafter, embodiments of the present invention will be described in detail with reference to the accompanying drawings.

On the assumption that an electrode assembly configured to have a structure in which at least one positive electrode and at least one negative electrode are alternately stacked in the state in which a separator is interposed therebetween is a unit cell, an electrode assembly according to the present invention may be a stacked type electrode assembly constituted by a single unit cell, a laminated/stacked type electrode assembly constituted by stacking unit cells, or a stacked/folded type electrode assembly manufactured by winding unit cells in the state in which the unit cells are disposed on a separation film.

The positive electrode may include a first positive electrode having a single positive electrode tab and a second positive electrode having two or more positive electrode tabs, and the negative electrode may include a first negative electrode having a single negative electrode tab and a second negative electrode having two or more negative electrode tabs.

Specifically, the second positive electrode includes a low-rate positive electrode tab configured to form a first positive electrode tab bundle as the result of coupling between only the positive electrode tabs of the second positive electrodes and a high-rate positive electrode tab configured to form a second positive electrode tab bundle as the result of coupling with the positive electrode tabs of the first positive electrodes, and the second negative electrode includes a low-rate negative electrode tab configured to form a first negative electrode tab bundle as the result of coupling between only the negative electrode tabs of the second negative electrodes and a high-rate negative electrode tab configured to form a second negative electrode tab bundle as the result of coupling with the negative electrode tabs of the first negative electrodes.

That is, the low-rate positive electrode tab is a positive electrode tab in which current flows in a low-output environment, wherein output is performed through the first positive electrode tab bundle, and the high-rate positive electrode tab is a positive electrode tab in which current flows in a high-output environment, wherein output is performed through the second positive electrode tab bundle. In a maximum-output environment requiring higher output than in the high-output environment, output is performed through both the low-rate positive electrode tab and the high-rate positive electrode tab.

The above description of the positive electrode tabs is also equally applied to the negative electrodes. Output is performed through a first negative electrode tab bundle, which is constituted by low-rate negative electrode tabs, in a low-output environment, output is performed through a second negative electrode tab bundle in a high-output environment, and output is performed through the first negative electrode tab bundle and the second negative electrode tab bundle in a maximum-output environment.

In the present invention, as described above, different electrode tab bundles are used depending on the three output conditions.

In connection therewith, FIG. 1 is an exploded view and a perspective view of an electrode assembly according to a first embodiment.

Referring to FIG. 1, the electrode assembly 100 includes a first positive electrode 110 having a single positive electrode tab 111, a first negative electrode 120 having a single negative electrode tab 121, a second positive electrode 130 having a high-rate positive electrode tab 131 and a low-rate positive electrode tab 132, and a second negative electrode 140 having a high-rate negative electrode tab 141 and a low-rate negative electrode tab 142, which are sequentially stacked, and another first positive electrode 110, another first negative electrode 120, another second positive electrode 130, and another second negative electrode 140, which are further sequentially stacked, i.e. a total of eight electrodes. For convenience of understanding, separators interposed between the positive electrodes and the negative electrodes are omitted.

The positive electrode tabs 111 of the first positive electrodes 110 and the high-rate positive electrode tabs 131 of the second positive electrodes 130 are stacked at the same position in the stacking direction of the electrode assembly. The positive electrode tabs 111 of the first positive electrodes 110 and the high-rate positive electrode tabs 131 of the second positive electrodes 130 are welded in the state of being disposed so as to overlap each other in order to form a second positive electrode tab bundle 152.

A first positive electrode tab bundle 151 is formed as the result of the low-rate positive electrode tabs 132 of the second positive electrodes 130 formed at the same position in the stacking direction being welded in the state of being disposed so as to overlap each other in the stacking direction of the electrode assembly.

In addition, the negative electrode tabs 121 of the first negative electrodes 120 and the high-rate negative electrode tabs 141 of the second negative electrodes 140 are stacked at the same position in the stacking direction of the electrode assembly. The negative electrode tabs 121 of the first negative electrodes 120 and the high-rate negative electrode tabs 141 of the second negative electrodes 140 are welded in the state of being disposed so as to overlap each other in order to form a second negative electrode tab bundle 162.

A first negative electrode tab bundle 161 is formed as the result of the low-rate positive electrode tabs 142 of the second negative electrodes formed at the same position in the stacking direction being welded in the state of being disposed so as to overlap each other in the stacking direction of the electrode assembly.

The high-rate positive electrode tab and the low-rate positive electrode tab are located at different outer peripheries of the positive electrode, and the high-rate negative electrode tab and the low-rate negative electrode tab are located at different outer peripheries of the negative electrode. For example, the high-rate positive electrode tab and the low-rate positive electrode tab may be located in opposite directions, and the high-rate negative electrode tab and the low-rate negative electrode tab may be located in opposite directions. In the electrode assembly 100 of FIG. 1, the high-rate positive electrode tab 131 and the low-rate positive electrode tab 132 of the second positive electrode 130 are formed in opposite directions, and the high-rate negative electrode tab 141 and the low-rate negative electrode tab 142 of the second negative electrode 140 are formed in opposite directions.

FIG. 2 is an exploded view and a perspective view of an electrode assembly according to a second embodiment.

Referring to FIG. 2, the electrode assembly 200 includes a first positive electrode 210 having a single positive electrode tab 211, a first negative electrode 220 having a single negative electrode tab 221, a second positive electrode 230 having a high-rate positive electrode tab 231 and a low-rate positive electrode tab 232, and a second negative electrode 240 having a high-rate negative electrode tab 241 and a low-rate negative electrode tab 242, which are sequentially stacked, and another first positive electrode 210, another first negative electrode 220, another second positive electrode 230, and another second negative electrode 240, which are further sequentially stacked, i.e. a total of eight electrodes. For convenience of understanding, separators interposed between the positive electrodes and the negative electrodes are omitted.

The positive electrode tabs 211 of the first positive electrodes 210 and the high-rate positive electrode tabs 231 of the second positive electrodes 230 are stacked at the same position in the stacking direction of the electrode assembly. The positive electrode tabs 211 of the first positive electrodes 210 and the high-rate positive electrode tabs 231 of the second positive electrodes 230 are welded in the state of being disposed so as to overlap each other in order to form a second positive electrode tab bundle 252.

A first positive electrode tab bundle 251 is formed as the result of the low-rate positive electrode tabs 232 of the second positive electrodes 230 formed at the same position in the stacking direction being welded in the state of being disposed so as to overlap each other in the stacking direction of the electrode assembly.

In addition, the negative electrode tabs 221 of the first negative electrodes 220 and the high-rate negative electrode tabs 241 of the second negative electrodes 240 are stacked at the same position in the stacking direction of the electrode assembly. The negative electrode tabs 221 of the first negative electrodes 220 and the high-rate negative electrode tabs 241 of the second negative electrodes 240 are welded in the state of being disposed so as to overlap each other in order to form a second negative electrode tab bundle 262.

A first negative electrode tab bundle 261 is formed as the result of the low-rate positive electrode tabs 242 of the second negative electrodes 240 formed at the same position in the stacking direction being welded in the state of being disposed so as to overlap each other in the stacking direction of the electrode assembly.

In the electrode assembly 200 of FIG. 2, the high-rate positive electrode tab 231 and the low-rate positive electrode tab 232 are formed at adjacent outer peripheries of the second positive electrode 230, and the high-rate negative electrode tab 241 and the low-rate negative electrode tab 242 are formed at adjacent outer peripheries of the second negative electrode 240.

Each of the electrode assembly 100 of FIG. 1 and the electrode assembly 200 of FIG. 2 includes a first positive electrode tab bundle, which is connected to a first positive electrode lead, a second positive electrode tab bundle, which is connected to a second positive electrode lead, a first negative electrode tab bundle, which is connected to a first negative electrode lead, and a second negative electrode tab bundle, which is connected to a second negative electrode lead.

The output amount and the charge and discharge rate of a pouch-shaped secondary battery according to the present invention may be adjusted depending on output conditions required for a vehicle in which the secondary battery is used. The secondary battery may be used in various kinds of devices ranging from a small device requiring low output to a device requiring very high output, such as an electric vehicle. In the case in which the secondary battery is applied to a device requiring high output, the output amount of the secondary battery may be adjusted depending on an output environment, whereby unnecessary power consumption may be reduced, and therefore a long lifespan characteristic of the secondary battery may be improved.

FIG. 3 is a front view showing the state in which electrode leads are connected to the electrode assembly of FIG. 1.

Referring to FIG. 3, the electrode assembly is the electrode assembly of FIG. 1. For convenience of understanding, the negative electrodes and the separators are omitted.

In the electrode assembly, the positive electrode tabs 111 of the first positive electrodes 110 and the high-rate positive electrode tabs 131 of the second positive electrodes 130 are coupled to each other in order to form a second positive electrode tab bundle 152, and the second positive electrode tab bundle 152 is connected to a second positive electrode lead 158. In addition, the low-rate positive electrode tabs 132 of the second positive electrodes 130 are coupled only to each other in order to form a first positive electrode tab bundle 151, and the first positive electrode tab bundle 151 is connected to a first positive electrode lead 157.

FIG. 4 is an exploded view and a perspective view of an electrode assembly according to a third embodiment.

Referring to FIG. 4, the electrode assembly 300 includes a first positive electrode 310, a first negative electrode 320, a second positive electrode 330, a second negative electrode 340, another first positive electrode 310, another first negative electrode 320, another second positive electrode 330, and another second negative electrode 340, which are stacked. For convenience of understanding, separators interposed between the positive electrodes and the negative electrodes are omitted.

The second positive electrode 330 includes a high-rate positive electrode tab 331 and a low-rate positive electrode tab 332. In consideration of the fact that charge and discharge through the high-rate positive electrode tab 331 are performed only under a high-rate condition, the width of the high-rate positive electrode tab 331 is formed so as to be greater than the width of the low-rate positive electrode tab 332, whereby it is possible to obtain effects in that charge and discharge speeds are increased and resistance is reduced.

Consequently, the width of each of the high-rate positive electrode tab 331 and a high-rate negative electrode tab 341 may be formed so as to be equal to or greater than the width of each of the low-rate positive electrode tab 332 and a low-rate negative electrode tab 342, preferably so as to be greater than the width of each of the low-rate positive electrode tab 332 and the low-rate negative electrode tab 342.

FIG. 5 is a vertical sectional view showing the state in which an electrode assembly according to a fourth embodiment is received in a battery case.

Referring to FIG. 5, the electrode assembly is received in the pouch-shaped battery case 470, and the electrode assembly includes first positive electrodes 410 and second positive electrodes 430. For convenience of understanding, first negative electrodes, second negative electrodes, and separators are omitted.

Positive electrode tabs 411 of the first positive electrodes 410 and high-rate positive electrode tabs 431 of the second positive electrodes 430 are coupled to each other and are also coupled to a second positive electrode lead 458, and low-rate positive electrode tabs 432 of the second positive electrodes 430 are coupled to each other and are also coupled to a first positive electrode lead 457. The first positive electrode lead 457 and the second positive electrode lead 458 are connected to each other in the pouch-shaped battery case 470.

A coupling portion between the first positive electrode lead 457 and the low-rate positive electrode tabs 432 may be configured in the form in which the low-rate positive electrode tabs 432 are coupled to one surface and the other surface of the first positive electrode lead 457, as shown in FIG. 5, or may be configured in the form in which the low-rate positive electrode tabs 432 constitute a first positive electrode tab bundle and the first positive electrode tab bundle is coupled to the first positive electrode lead 457.

Alternatively, unlike what is shown in FIG. 5, the positive electrode tabs of the first positive electrodes and the low-rate positive electrode tabs and the high-rate positive electrode tabs of the second positive electrodes are all coupled to an integrated positive electrode lead, instead of the separate positive electrode leads, such as the first positive electrode lead and the second positive electrode lead.

In the negative electrodes omitted from FIG. 5, the form of coupling between the positive electrodes may be equally applied to the form of coupling between negative electrode tabs and the form of coupling between the negative electrode tabs and negative electrode leads.

Those skilled in the art to which the present invention pertains will appreciate that various applications and modifications are possible within the category of the present invention based on the above description.

DESCRIPTION OF REFERENCE NUMERALS 100, 200, 300: Electrode assemblies
110, 210, 310, 410: First positive electrodes
111, 211, 411: Positive electrode tabs
120, 220, 320: First negative electrodes
121, 221: Negative electrode tabs
130, 230, 330, 430: Second positive electrodes
131, 231, 331, 431: High-rate positive electrode tabs
132, 232, 332, 432: Low-rate positive electrode tabs
140, 240, 340: Second negative electrodes
141, 241, 341: High-rate negative electrode tabs
142, 242, 342: Low-rate negative electrode tabs
151, 251: First positive electrode tab bundles
152, 252: Second positive electrode tab bundles
157, 457: First positive electrode leads
158, 458: Second positive electrode leads
161, 261: First negative electrode tab bundles
162, 262: Second negative electrode tab bundles
470: Pouch-shaped battery case

INDUSTRIAL APPLICABILITY

As is apparent from the above description, an electrode assembly according to the present invention includes an electrode having a plurality of electrode tabs, charge and discharge speed is high and a heat generation phenomenon at electrode tab portions is reduced, whereby it is possible to prevent deterioration in function of the electrode assembly.

Also, in the case in which high output or the maximum output is necessary, control is performed such that current flows in a high-rate positive electrode tab and a high-rate negative electrode tab, whereby it is possible to adjust the output amount of the electrode assembly.

In addition, separate electrode leads are connected to a high-output positive electrode tab and a high-output negative electrode tab in order to constitute a parallel connection structure, whereby it is possible to minimize an increase in resistance even in the case in which the size of the electrode is increased.

The invention claimed is:

1. An electrode assembly for a secondary battery comprising:
    at least two positive electrodes and at least two negative electrodes alternately stacked in a state in which a separator is interposed therebetween,
    wherein the at least two positive electrodes comprise at least one first positive electrode having a single positive electrode tab and at least one second positive electrode having two or more positive electrode tabs,
    wherein the at least two negative electrodes comprise at least one first negative electrode having a single negative electrode tab and at least one second negative electrode having two or more negative electrode tabs, and
    wherein the single positive electrode tab of the at least one first positive electrode aligns with one of the two or more positive electrode tabs of the at least one second positive electrode when the at least two positive electrodes are stacked.

2. The electrode assembly for a secondary battery according to claim 1, wherein the at least one second positive electrode comprises a low-rate positive electrode tab configured to form a first positive electrode tab bundle and a high-rate positive electrode tab configured to form a second positive electrode tab bundle, and
    wherein the at least one second negative electrode comprises a low-rate negative electrode tab configured to form a first negative electrode tab bundle and a high-rate negative electrode tab configured to form a second negative electrode tab bundle.

3. The electrode assembly for a secondary battery according to claim 2, wherein the high-rate positive electrode tab and the low-rate positive electrode tab are located at different outer peripheries of the positive electrode, and
    wherein the high-rate negative electrode tab and the low-rate negative electrode tab are located at different outer peripheries of the negative electrode.

4. The electrode assembly for a secondary battery according to claim 3, wherein the high-rate positive electrode tab and the low-rate positive electrode tab extend in opposite directions, and
    wherein the high-rate negative electrode tab and the low-rate negative electrode tab extend in opposite directions.

5. The electrode assembly for a secondary battery according to claim 2, wherein a width of each of the high-rate positive electrode tab and the high-rate negative electrode tab is equal to or greater than a width of each of the low-rate positive electrode tab and the low-rate negative electrode tab.

6. The electrode assembly for a secondary battery according to claim 2, further comprising a first positive electrode lead and a second positive electrode lead connected to the first positive electrode tab bundle and the second positive electrode tab bundle, respectively; and
    a first negative electrode lead and a second negative electrode lead connected to the first negative electrode tab bundle and the second negative electrode tab bundle, respectively.

7. The electrode assembly for a secondary battery according to claim 6, wherein the first positive electrode lead and the second positive electrode lead are connected to each other and the first negative electrode lead and the second negative electrode lead are connected to each other in a battery case.

8. The electrode assembly for a secondary battery according to claim 2, wherein charge and discharge of a secondary battery through the second positive electrode tab bundle and the second negative electrode tab bundle are performed only under a high-rate condition.

9. The electrode assembly for a secondary battery according to claim 2, wherein charge and discharge of a secondary battery through the first positive electrode tab bundle, the second positive electrode tab bundle, the first negative electrode tab bundle, and the second negative electrode tab bundle are performed only under a maximum-rate condition.

10. A pouch-shaped secondary battery comprising:
    a pouch-shaped battery case; and
    the electrode assembly for a secondary battery according to claim 6 in the pouch-shaped battery case.

11. A battery pack comprising the pouch-shaped secondary battery according to claim 10, wherein the battery pack comprises a controller configured to adjust an output amount of the battery pack.

12. The battery pack according to claim 11, wherein the controller is configured:
    to determine a low-rate condition, a high-rate condition, and a maximum-rate condition;
    to perform output through a first positive electrode tab bundle and a first negative electrode tab bundle under the low-rate condition;
    to perform output through a second positive electrode tab bundle and a second negative electrode tab bundle under the high-rate condition; and
    to perform output through the first positive electrode tab bundle, the second positive electrode tab bundle, the first negative electrode tab bundle, and the second negative electrode tab bundle under the maximum-rate condition.

13. The electrode assembly for a secondary battery according to claim 1, wherein the two or more positive electrode tabs are perpendicular to each other, and
    wherein the two or more negative electrode tabs are perpendicular to each other.

14. An electrode assembly for a secondary battery comprising:
    at least two positive electrodes and at least two negative electrodes alternately stacked in a state in which a separator is interposed therebetween,
    wherein the at least two positive electrodes comprise at least one first positive electrode having a single positive electrode tab and at least one second positive electrode having two or more positive electrode tabs,
    wherein the at least two negative electrodes comprise at least one first negative electrode having a single negative electrode tab and at least one second negative electrode having two or more negative electrode tabs, and
    wherein the single negative electrode tab of the at least one first negative electrode aligns with one of the two or more negative electrode tabs of the at least one second negative electrode when the at least two negative electrodes are stacked.

\* \* \* \* \*